US011544491B2

(12) United States Patent
Pouyan et al.

(10) Patent No.: US 11,544,491 B2
(45) Date of Patent: Jan. 3, 2023

(54) DATA CLUSTERING

(71) Applicant: Accenture Global Solutions Limited, Dublin (IE)

(72) Inventors: Maziyar Baran Pouyan, Emeryville, CA (US); Yao A. Yang, San Francisco, CA (US); Saeideh Shahrokh Esfahani, Mountain View, CA (US); Andrew E. Fano, Lincolnshire, IL (US); David William Vinson, San Francisco, CA (US); Timothy M. Shea, Merced, CA (US); Jesus Sanchez-Macias, Oakland, CA (US)

(73) Assignee: Accenture Global Solutions Limited, Dublin (IE)

( * ) Notice: Subject to any disclaimer, the term of this patent is extended or adjusted under 35 U.S.C. 154(b) by 428 days.

(21) Appl. No.: 16/743,306

(22) Filed: Jan. 15, 2020

(65) Prior Publication Data

US 2021/0216813 A1 Jul. 15, 2021

(51) Int. Cl.
*G06K 9/62* (2022.01)
*G06N 20/00* (2019.01)

(52) U.S. Cl.
CPC ......... *G06K 9/6224* (2013.01); *G06K 9/6223* (2013.01); *G06K 9/6256* (2013.01); *G06K 9/6269* (2013.01); *G06N 20/00* (2019.01)

(58) Field of Classification Search
CPC .. G06K 9/6223; G06K 9/6224; G06K 9/6256; G06K 9/6269; G06K 9/6276; G06K 9/6282; G06N 20/10; G06N 20/20; G06N 5/003; G06N 5/025
See application file for complete search history.

(56) References Cited

U.S. PATENT DOCUMENTS

| 2005/0189414 | A1* | 9/2005 | Fano | G06Q 30/02 705/14.27 |
| 2019/0019061 | A1* | 1/2019 | Trenholm | G06K 9/6259 |
| 2019/0147297 | A1* | 5/2019 | Rogers | G06F 16/904 706/12 |

* cited by examiner

*Primary Examiner* — Ruiping Li
(74) *Attorney, Agent, or Firm* — Fish & Richardson P.C.

(57) ABSTRACT

Methods, systems, and apparatus, including computer programs encoded on a computer storage medium, for clustering data are disclosed. In one aspect, a method includes the actions of receiving feature vectors. The actions further include, for a subset of the feature vectors, accessing a first label. The actions further include generating a classifier that is configured to associate a given feature vector with a feature vector of the subset of the feature vectors. The actions further include applying the feature vectors that are not included in the subset of the feature vectors to the classifier. The actions further include generating a dissimilarity matrix. The actions further include, based on the dissimilarity matrix, generating a graph. The actions further include, for each node of the graph, determining a second label. The actions further include, based on the second labels and the first labels, determining a training label for each feature vector.

20 Claims, 4 Drawing Sheets

DATA CLUSTERING

TECHNICAL FIELD

This disclosure generally relates to machine learning.

BACKGROUND

Machine learning is related to techniques that computer systems use to perform a specific task without using explicit instructions, relying on patterns and inference instead. Machine learning algorithms build a mathematical model based on sample data in order to make predictions or decisions without being explicitly programmed to perform the task.

SUMMARY

In order to take advantage of the power of machine learning, a system requires a large amount of data that is appropriately labeled in order to train a model. For example, if a system is training a model to distinguish between pictures of cats and dogs, then the training data should include pictures of cats and pictures of dogs. The system may also require that each picture be labeled as including a cat or including a dog. When data sets grow in size and complexity and the number of labels also grows, accessing data that is already labeled can be challenging.

To overcome this challenge and label data for a machine learning process, it is helpful to be able to cluster the unlabeled data into similar groups. A system can cluster data by generating a graph using the data. The system can select a datapoint from each cluster and obtain a label for each of the selected datapoints. Using this labeled subset of the data, the system can train a random forest classifier. The system can calculate a dissimilarity matrix based on the remaining data and the random forest classifier. Using the dissimilarity matrix, the system can determine labels for the remaining datapoints of the unlabeled data. The system determines label accuracy scores and obtains updated labels for any of datapoints with lower label accuracy scores.

According to an innovative aspect of the subject matter described in this application, a method for clustering data includes the actions of receiving, by a computing device, feature vectors; for a subset of the feature vectors, accessing, by the computing device, a first label; based on the labels for the subset of feature vectors, generating, by the computing device, a classifier that is configured to associate a given feature vector with a feature vector of the subset of the feature vectors; applying, by the computing device, the feature vectors that are not included in the subset of the feature vectors to the classifier; based on applying the feature vectors that are not included in the subset of the feature vectors to the classifier, generating, by the computing device, a dissimilarity matrix; based on the dissimilarity matrix, generating, by the computing device, a graph; for each node of the graph, determining, by the computing device, a second label; and, based on the second labels and the first labels, determining, by the computing device, a training label for each of the feature vectors.

These and other implementations can each optionally include one or more of the following features. The actions further include, based on the feature vectors, generating, by the computing device, an additional graph; and, based on the additional graph, selecting, by the computing device, the subset of the feature vectors. The actions further include, for each node of the additional graph, determining, by the computing device, a k-nearest neighbor; and, based on the k-nearest neighbors for each node of the additional graph, clustering, by the computing device, the nodes of the additional graph. The subset of the feature vectors is selected based on the clustering of the nodes of the additional graph. The actions further include selecting, by the computing device, a node from each cluster. The subset of the feature vectors is selected based on the node from each cluster. The classifier is a random forest classifier. The action of generating the dissimilarity matrix includes determining, by the computing device, a similarity matrix based on applying the feature vectors that are not included in the subset of the feature vectors to the classifier. The dissimilarity matrix is based on the similarity matrix. The action of determining the second label for each node of the graph includes, for each node of the graph, determining, by the computing device, a k-nearest neighbor. The actions further include training, by the computing device using machine learning, a model using the feature vectors and the training label for each feature vector. The actions further include determining, by the computing device, a level of accuracy of the second labels. The training labels are based on the level of accuracy of the second labels.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system is able to cluster data more efficiently. The clustered data may be easier to label.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1A:
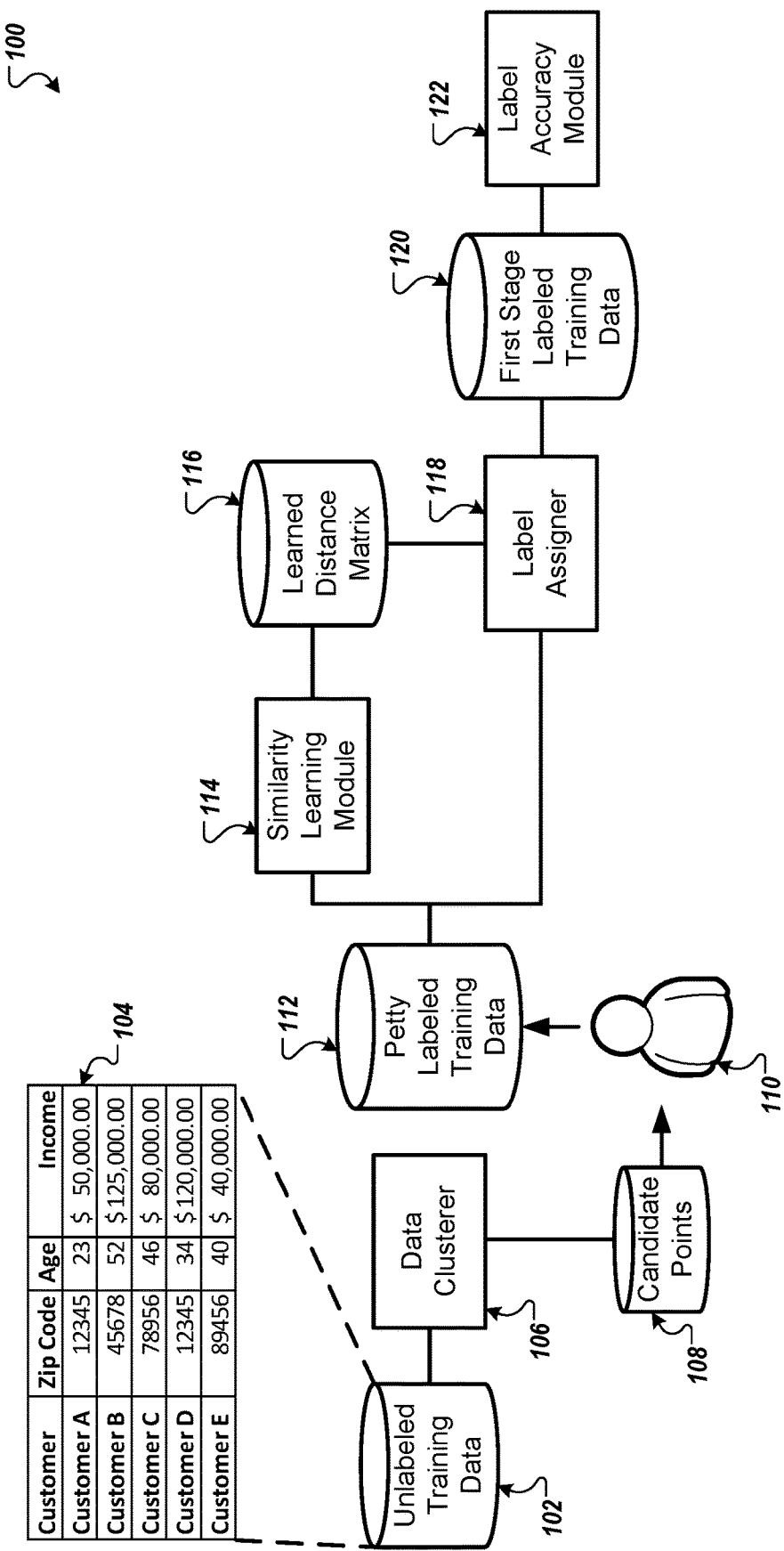
FIGS. 1A and 1B illustrate an example system labeling data for use in a machine learning system.
Figure 1B:
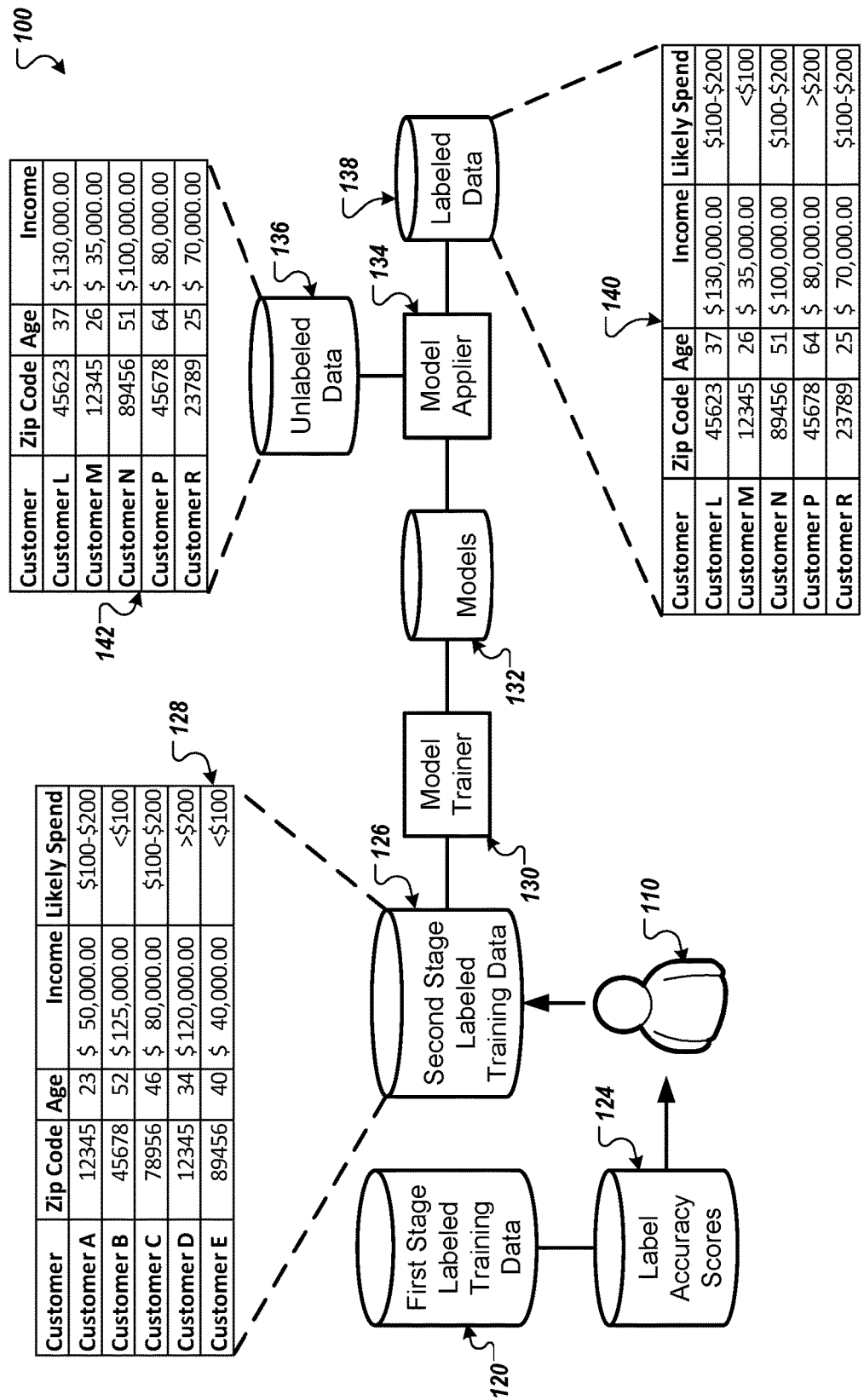

FIGS. 1A and 1B illustrate an example system 100 labeling data for use in a machine learning system. Briefly, and as described in more detail below, the system 100 receives unlabeled training data 102 that, to be used in a machine learning process, should include labels for each portion of the data. The system 100 performs various clustering and similarity techniques to assign labels to the unlabeled training data 102. With the unlabeled training data 102 now labeled, the system 100 trains a model 132 using machine learning and uses the model to assign labels to additional unlabeled data 136.

In more detail, the system 100 receives unlabeled training 102 that includes a series of vectors 104, or datapoints. Each vector includes a number of fields that each include a value. The value may be represented by a number or text. In this example, each vector represents a customer. Each customer vector includes values for the zip code field, the age field, and the income field. Customer A may live in the zip code 12345, be twenty-three years old, and have an annual income of $50,000. The vectors 104 include similar vectors for Customers B, C, D, and E, some with different values for each field. While the received unlabeled training 102 includes five vectors 104 in the example of FIG. 1, the unlabeled training data 102 would typically include many more vectors such as thousands or tens of thousands. Additionally, each of the vectors 104 may include many more fields such as hundreds or thousands of fields.

Some of these customers may spend different amounts of money in a store each month. Some may spend less than $100. Some may spend between $100 and $200. Some may spend more than $200. It would be helpful to identify the level of likely spending for each customer to create effective marketing campaigns. It would be helpful to use a machine learning process to identify the likely spending level for each customer, but without spending data for each customer, it is difficult to train a machine learning model to identify a likely spending level for a customer based on zip code, age, and income.

To assign labels, the system 100 provides the unlabeled training data 102 to a data clusterer 106. The data clusterer 106 utilizes a graph-based data clustering approach. The data clusterer 106 constructs a k-nearest neighbor graph to model the Euclidean structure of a manifold of data. The data clusterer 106 generates an initial graph G={V, E} to indicate the graph corresponding to the unlabeled training data 102 where V={$v_1, v_2, \ldots, v_N$} is the set of N vertices and E is a subset of V×V and denotes the set of edges among the vertices of G. In the graph G, each vertex $v_i$ indicates a datapoint $x_i$ in the unlabeled training data 102. The data clusterer 106 models the local neighborhood of each datapoint by assigning that point to its K nearest neighbor using Euclidean distance metric. After constructing the graph G, the data clusterer 106 clusters the graph G to extract all or nearly all the communities within the graph G. Each community of the graph G is a population of nodes that are connected to each other. The data clusterer 106 may user a variety of techniques to cluster the graph G. In one example, the data clusterer 106 may use Infomap to cluster G. Infomap community detection may automatically extract all or nearly all of the possible clusters from graph G without any predefined knowledge about the number of clusters.

With the data clusterer 106 identifying the clusters of the unlabeled training data 104, the data clusterer 106 identifies a set of candidate points 108. The data clusterer 106 may select a candidate point from each cluster. In some instances, the data clusterer 106 may select the candidate point from each cluster with the highest degree in each cluster. For example, the data clusterer 106 may identify two clusters in the vectors 104. A first cluster may include customers A and D, and a second cluster may include customers B, C, and E. The data clusterer 106 may select the vectors for customers A and C as the candidate points.

The data clusterer 106 provides the candidate points 108 to the user 110. The user 110 provides labels to the candidate points 108. The system 100 stores the labeled candidate points 108 at the petty labeled training data 112. For example, the user 110 may provide a label of a likely spend of $100 to $200 for customer A and a likely spend of greater than $200 for customer C. In some implementations, the system 100 may automatically determine labels for the candidate points 108 without the input of the user 110. In this instance, the system 100 may estimate the labels based on the identified clusters.

The system 100 provides the petty labeled training data 112 to the similarity learning module 114. The similarity learning module 114 is configured to train a random forest classifier on the petty labeled training data 112 to generate an ensemble of decision trees. With the ensemble of decision trees, the system 100 provides the remaining unlabeled training data 102 that was not included in the petty labeled training data 112. The system 100 provides each of the remaining unlabeled training data 102 and land on a leaf node of the random forest classifier. The system 100 calculates a random-forest based similarity between the pairs of datapoints. The random forest classifier may contain N trees and define $nt(x_i, x_j)$ as the number of trees that classify data points $x_i$ and $x_j$ using the same leaf. The random forest based similarity matrix S may be defined as $S_{ij}=nt(x_i, x_j)/N$. The system 100 may determine a corresponding dissimilarity matrix D where D=1−S. The system 100 may repeat this process P times, and the system 100 aggregates the individual similarity matrices Si into a final matrix S=ΣSi/P and related D matrix. The system 100 may stores the matrixes S and D in the learned distance matrix 116.

The system 100 generates another graph G' from the extracted dissimilarity matrix D. As noted above, graph G models Euclidian manifold of the unlabeled training data 102, which may not address semantic manifold of desired labels properly. However, matrix D of learned distance matrix 116 captures the semantic dissimilarity of the unlabeled training data 102. The system builds graph G' in a similar way to graph G. In other words, graph G'={V, E} is the graph corresponding to the unlabeled training data 102 where V={$v_1, v_2, \ldots, v_N$} is the set of N vertices and E is a subset of V×V. E is the set of edges among the vertices of G. In G', each vertex $v_i$ indicates a datapoint $x_i$ in the unlabeled training data 102. The system 100 models the local neighbor of each datapoint by assigning that point to tis K nearest neighbors using semantic dissimilarity calculated as matrix D. Upon extraction of the graph G', the system 100 assigns the labels in the petty labeled training data 112 of the candidate points 108 to the corresponding vertices. The label assigner 118 performs a label propagation algorithm to the graph G' to predict the labels for all the nodes in G'. The label propagation algorithm may operate in semi-supervised mode.

The system 100 stores the labels for the training data 102 in the first stage labeled training data 120. The label accuracy module 122 assess the quality of the labeling process performed by the label assigner 118. The label accuracy module 122 identifies a subset of vectors from the training data. For example, the label accuracy module 122 may identify fifty vectors. In some implementations, the label accuracy module 122 may identify the same number of vectors as those included in the candidate points 108. The label accuracy module 122 performs the label propagation algorithm multiple times on graph G' to generate multiple labels for the identified vectors. The label accuracy module 122 may perform the label propagation algorithm the same number of times as the number of identified vectors.

The label accuracy module 122 generates a label set matrix L based on the extracted labels. In label set matrix L, each row denotes a datapoint and each column indicates each estimated label. The size of L is the number of identified vectors multiplied by the number of datapoints in the training data. The label accuracy module 122 performs an outlier detection algorithm, such as Isolation Forest, to the matrix L to determine a labeling score for each of the datapoints. The label accuracy module 122 calculates a normalized average of the labeling scores to determine a total label score for the labeling process.

The system 100 stores the label scores in the label accuracy scores 124. In some implementations, the system 100 performs additional processing if the label accuracy scores 124 are below a threshold. In one example, the system 100 provides the datapoints that have label accuracy scores below a threshold to the user 110. The user 110 may analyze the labels assigned to each datapoint and update any of the labels. The resulting updated labeled data may be stored in the second stage labeled training data 126. In another example, the system 100 provides a certain percentage of the datapoints with the lowest label accuracy scores to the user 110. For example, the system 100 may provide the datapoints with the lowest ten percent of the label accuracy scores. The user 110 may analyze the labels assigned to each datapoint and update any of the labels. The resulting updated labeled data may be stored in the second stage labeled training data 126.

In some implementations, the system 100 may automatically update the labels if the label accuracy score is below a threshold or update the label for the group with the lowest label accuracy scores. For example, the system 100 may change the labels the datapoints with the lowest scores by changing the labels. The label accuracy module 122 may recalculate the label accuracy scores after changing the labels. If the label accuracy score showed an increase in accuracy, then the system 100 may store the updated labels in the second stage labeled training data 126. If the label accuracy score showed a decrease in accuracy, then the system 100 may store unchanged labels in the second stage labeled training data 126.

As illustrated in FIG. 1B, the second stage labeled training data 126 includes vectors, or datapoints, 128 that include labels for the likely spend for each of the customers. For example, the system 100 identified the label of likely spend of greater than $200 for customer E. In some instances, the labels of the second stage labeled training data 126 may be different than those identified in the petty labeled training data 112. In some instances, the labels of the second stage labeled training data 126 may be the same as those identified in the petty labeled training data 112.

With the unlabeled training data 105 now labeled in the second stage labeled training data, the system provides the labeled training data to the model trainer 130. The model trainer 130 is configured to train a model 132 using machine learning and the second stage labeled training data 126. The model trainer 130 trains the model 132 such that the model 132 is configured to receive a zip code, age, and income for a customer and output whether the customer is likely to spend less than $100, more than $200, or between $100 and 200.

The model trainer 130 stores the model 132 along with other models trained on other training data labeled by the system 100. The model applier 134 provides unlabeled data 136 as an input to the model 132 to generate labeled data 138.

In the example of FIG. 1B, the example unlabeled data 142 includes data for five customers. Customer L lives in zip code 45623, is 37 years old, and has an income of $130,000. The example unlabeled data 142 also includes data for customers M, N, P, and R. The model applier 134 selects, from the models 132, the model trained to identify the likely spending of a customer based on an input of zip code, age, and income. The model applier 134 provides the example unlabeled data 142 as an input to the selected model. The model outputs the example labeled data 140 that includes labels for each of the customers L, M, N, P, and R. For example, the model outputs that customer N is likely to spend between $100 and $200 dollars.

In some instances, the labels identified by the model 132 may be different than a label in the second stage labeled training data 126 or the petty labeled training data 112 for a similar vector or datapoint.

In some implementations, the system 100 may receive additional data after the customers have finished their purchases and the total spent by each customer is known. The system 100 may receive this data, and the model trainer 130 may update the model if there are some totals that do not match the labels identified by the model 132. For example, customer P may have spent $150. The model trainer 130 may receive this data, update the training data, and use machine learning to update the model. In some instances, the system 100 may include the data for each customer and the totals spent in the training data.

Figure 2:
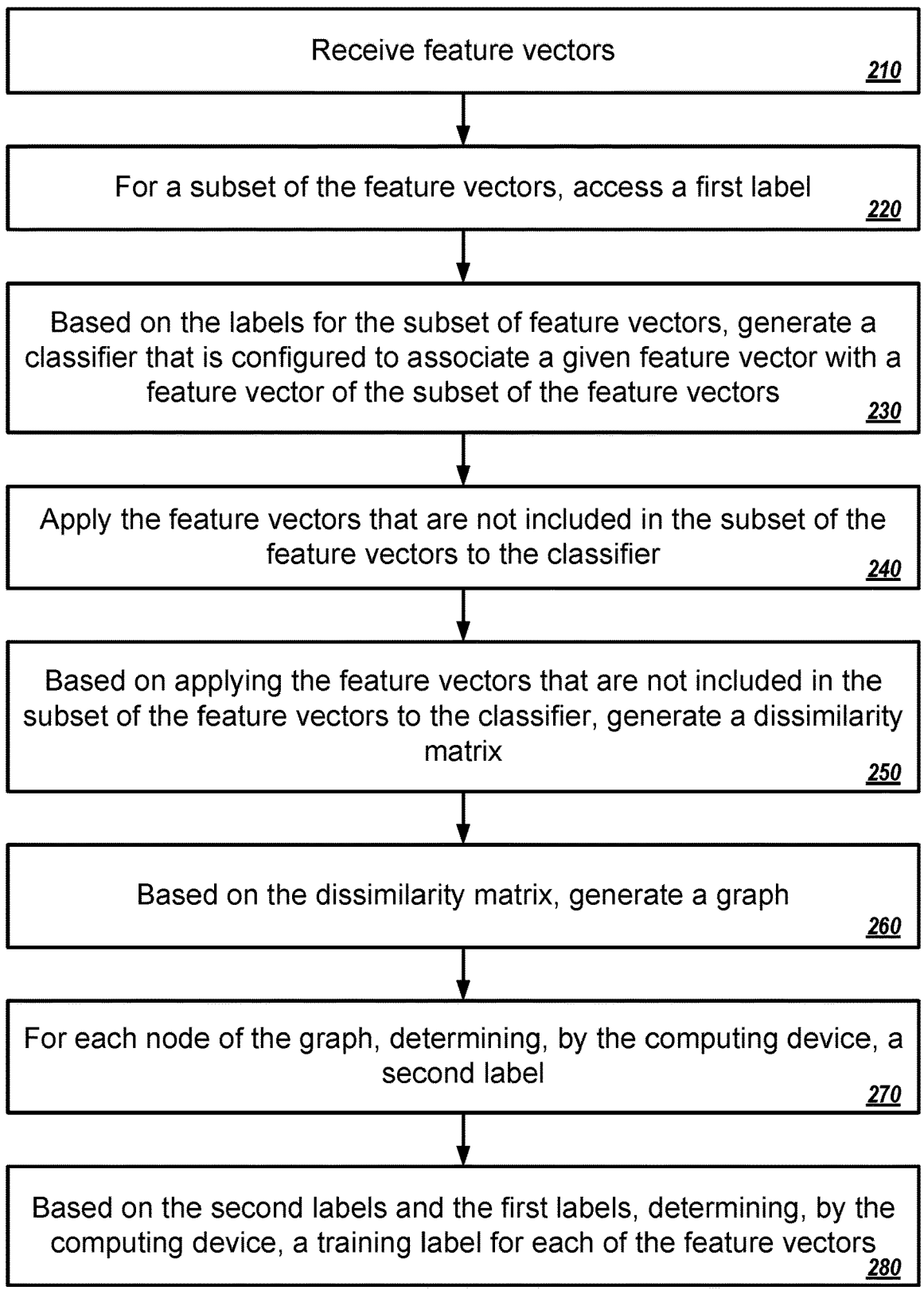
FIG. 2 is a flowchart of an example process for labeling data for use in a machine learning system.

FIG. 2 is a flowchart of an example process for labeling data for use in a machine learning system. In general, the process 200 receives unlabeled training data and clusters the data. The process 200 selects a candidate point from each cluster and identifies a label for that candidate point. Using the labeled candidate point, the process generates labels for the remaining training data. The process 300 will be described as being performed by a computer system comprising one or more computers, for example, the system 100 as shown in FIGS. 1A and 1B.

The system receives feature vectors (210). The feature vectors may also be referred to as datapoints. For example, the feature vectors may include vectors that include data related to customers of a particular store. The feature vectors may not include labels that identify, for example, an expected amount that each customer will spend in the store.

The system, for a subset of the feature vectors, accesses a first label (220). To identify the subset, the system generates a graph using the feature vectors. The system determines, for each node on the graph, the k-nearest neighbors. Based on the k-nearest neighbors, the system clusters the nodes of the graph. Each node represents a feature vector, or datapoint. Therefore, the clusters are clusters of feature vectors. The system selects a feature vector, or datapoint, from each cluster as the subset of the feature vectors. In some implementations, the system receives the first labels for the subset of feature vectors from a user. In some implementations, the system automatically generates the first labels for the subset of feature vectors.

The system, based on the labels for the subset of feature vectors, generates a classifier that is configured to associate a given feature vector with a feature vector of the subset of the feature vectors (230). In some implementations, the classifier is a random forest classifier. The system applies the feature vectors that are not included in the subset of the feature vectors to the classifier (240).

The system, based on applying the feature vectors that are not included in the subset of the feature vectors to the classifier, generates a dissimilarity matrix (250). In some implementations, the system determines a similarity matrix based on applying the feature vectors that are not included in the subset of the feature vectors to the classifier. In some implementations, the dissimilarity matrix is based on the similarity matrix.

The system, based on the dissimilarity matrix, generates a graph (260). In some implementations, the system generates this graph in a similar manner as the graph in stage 220.

The system, for each node of the graph, determines a second label (270). In some implementations, the system determines the k-nearest neighbors for each node in the graph. The system determines the second label for based on the k-nearest neighbors.

The system, based on the second labels and the first labels, determines a training label for each of the feature vectors (280). In some implementations, the system determines a label accuracy score for the training labels. The system may update the training labels if the label accuracy score is below a threshold. For example, the system may update the training labels by receiving input from a user regarding the training labels with a label accuracy score that is below a threshold. As another example, the system may automatically update the training labels that have a label accuracy score that is below a threshold.

In some implementations, the system trains a model using the feature vectors and the corresponding training labels. The system may train the model using machine learning. The model may be configured to receive a feature vector and output the appropriate label for that feature vector.

Figure 3:
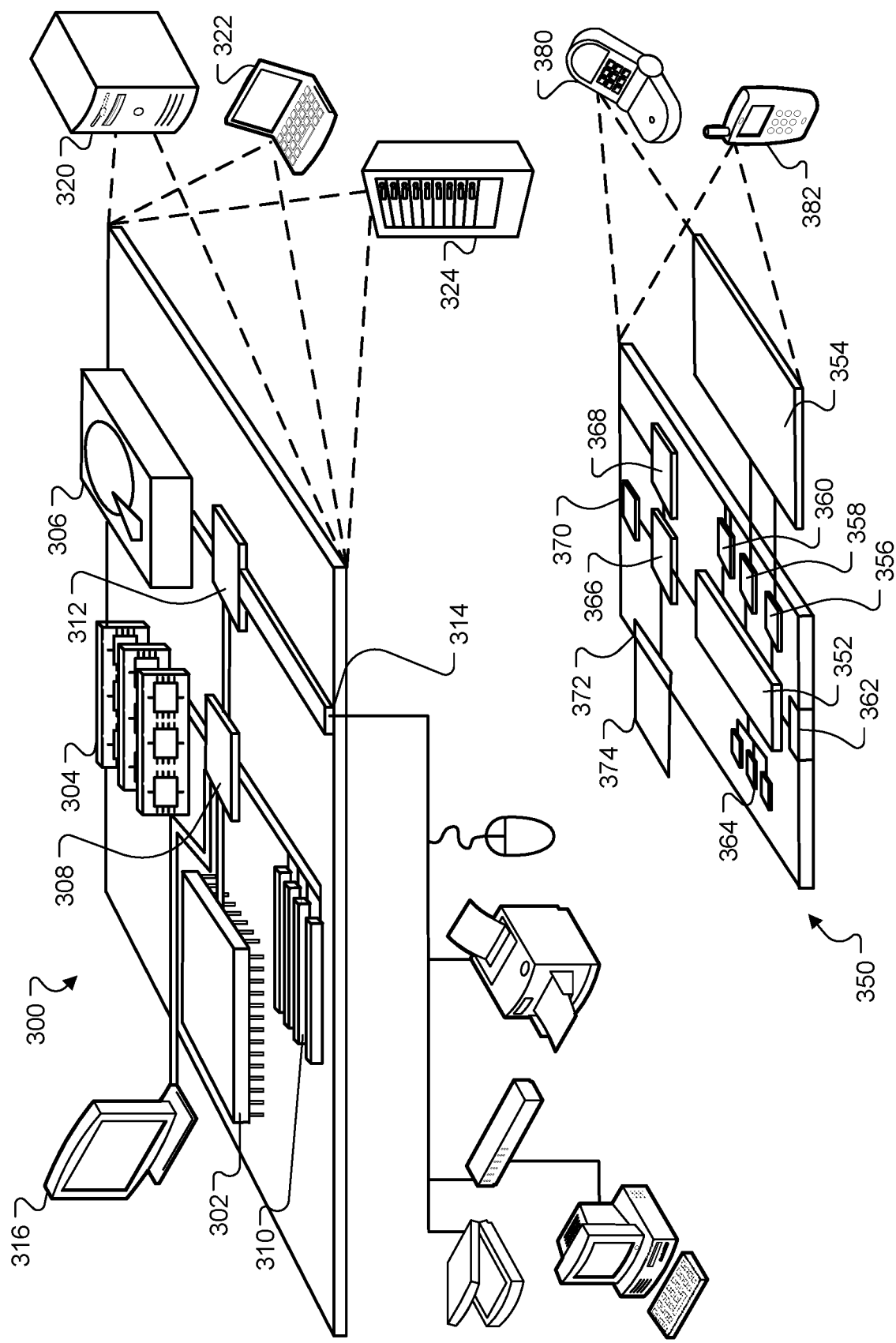
FIG. 3 illustrates an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various buses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows described in the application do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims. Also, a feature described in one aspect or implementation may be applied in any other aspect or implementation.

What is claimed is:

1. A computer-implemented method comprising:
receiving, by a computing device, a set of feature vectors, each feature vector corresponding to a service consumer and comprising a plurality of fields, each field comprising a value, the plurality of fields describing attributes of a respective feature vector, at least one field of the plurality of fields being associated with a service;
accessing, by the computing device, a first set of labels for a subset of feature vectors provided from the set of feature vectors, labels in the first set of labels being assigned feature vectors in the subset of feature vectors to provide a subset of labeled feature vectors;
based on the first subset of labeled feature vectors, generating, by the computing device, a classifier that is configured to associate unlabeled feature vectors with labeled feature vectors of the subset of labeled feature vectors;
applying, by the computing device, unlabeled feature vectors of the set of feature vectors to the classifier to provide a dissimilarity matrix based on a total number of trees in the classifier and sub-numbers of trees in the classifier, each sub-number of trees being specific to a feature vector and indicating a number of trees that classify the feature vector to a same leaf;
based on the dissimilarity matrix, generating, by the computing device, a graph;
for each node of the graph, determining, by the computing device, a second set of labels; and
based on the second set of labels and the first set of labels, determining, by the computing device, a training label for each of the feature vectors in the set of feature vectors to identify a likely level of consumption of the service by service consumers.

2. The method of claim 1, comprising:
based on the feature vectors in the set of feature vectors, generating, by the computing device, an additional graph; and
based on the additional graph, selecting, by the computing device, feature vectors to include in the subset of feature vectors.

3. The method of claim 2, comprising:
for each node of the additional graph, determining, by the computing device, a k-nearest neighbor; and
based on the k-nearest neighbors for each node of the additional graph, clustering, by the computing device, the nodes of the additional graph,
wherein the subset of feature vectors is selected based on the clustering of the nodes of the additional graph.

4. The method of claim 3, comprising:
selecting, by the computing device, a node from each cluster,
wherein the subset of feature vectors is selected based on the node from each cluster.

5. The method of claim 1, wherein the classifier is a random forest classifier.

6. The method of claim 1, wherein generating the dissimilarity matrix comprises:
determining, by the computing device, a similarity matrix based on applying feature vectors that are not included in the subset of feature vectors to the classifier,
wherein the dissimilarity matrix is based on the similarity matrix.

7. The method of claim 1, wherein determining the second set of labels for each node of the graph comprises:
for each node of the graph, determining, by the computing device, a k-nearest neighbor.

8. The method of claim 1, further comprising:
training, by the computing device using machine learning, a model using the feature vectors and the training label for each feature vector.

9. The method of claim 1, comprising:
determining, by the computing device, a level of accuracy of labels in the second set of labels,
wherein the training label are based on the level of accuracy of the labels in the second set of labels.

10. A system comprising:
one or more computers; and
one or more storage devices storing instructions that are operable, when executed by the one or more computers, to cause the one or more computers to perform operations comprising:
receiving, by a computing device, a set of feature vectors, each feature vector corresponding to a service consumer and comprising a plurality of fields, each field comprising a value, the plurality of fields describing attributes of a respective feature vector, at least one field of the plurality of fields being associated with a service;
accessing, by the computing device, a first set of labels for a subset of feature vectors provided from the set of feature vectors, labels in the first set of labels being assigned feature vectors in the subset of feature vectors to provide a subset of labeled feature vectors;
based on the first subset of labeled feature vectors, generating, by the computing device, a classifier that is configured to associate unlabeled feature vectors with labeled feature vectors of the subset of labeled feature vectors;
applying, by the computing device, unlabeled feature vectors of the set of feature vectors to the classifier to provide a dissimilarity matrix based on a total number of trees in the classifier and sub-numbers of trees in the classifier, each sub-number of trees being specific to a feature vector and indicating a number of trees that classify the feature vector to a same leaf;
based on the dissimilarity matrix, generating, by the computing device, a graph;
for each node of the graph, determining, by the computing device, a second set of labels; and
based on the second set of labels and the first set of labels, determining, by the computing device, a training label for each of the feature vectors in the set of feature vectors to identify a likely level of consumption of the service by service consumers.

11. The system of claim 10, wherein the operations comprise:
based on the feature vectors in the set of feature vectors, generating, by the computing device, an additional graph; and
based on the additional graph, selecting, by the computing device, feature vectors to include in the subset of feature vectors.

12. The system of claim 11, wherein the operations comprise:
for each node of the additional graph, determining, by the computing device, a k-nearest neighbor; and
based on the k-nearest neighbors for each node of the additional graph, clustering, by the computing device, the nodes of the additional graph,
wherein the subset of feature vectors is selected based on the clustering of the nodes of the additional graph.

13. The system of claim 12, wherein the operations comprise:
selecting, by the computing device, a node from each cluster,
wherein the subset of feature vectors is selected based on the node from each cluster.

14. The system of claim 10, wherein the classifier is a random forest classifier.

15. The system of claim 10, wherein generating the dissimilarity matrix comprises:
determining, by the computing device, a similarity matrix based on applying feature vectors that are not included in the subset of feature vectors to the classifier,
wherein the dissimilarity matrix is based on the similarity matrix.

16. The system of claim 10, wherein determining the second set of labels for each node of the graph comprises:
for each node of the graph, determining, by the computing device, a k-nearest neighbor.

17. The system of claim 10, wherein the operations comprise:
training, by the computing device using machine learning, a model using the feature vectors and the training label for each feature vector.

18. The system of claim 10, wherein the operations comprise:
determining, by the computing device, a level of accuracy of labels in the second set of labels,
wherein the training label are based on the level of accuracy of the labels in the second set of labels.

19. A non-transitory computer-readable medium storing software comprising instructions executable by one or more computers which, upon such execution, cause the one or more computers to perform operations comprising:
receiving, by a computing device, a set of feature vectors, each feature vector corresponding to a service consumer and comprising a plurality of fields, each field comprising a value, the plurality of fields describing attributes of a respective feature vector, at least one field of the plurality of fields being associated with a service;
accessing, by the computing device, a first set of labels for a subset of feature vectors provided from the set of feature vectors, labels in the first set of labels being assigned feature vectors in the subset of feature vectors to provide a subset of labeled feature vectors;
based on the first subset of labeled feature vectors, generating, by the computing device, a classifier that is configured to associate unlabeled feature vectors with labeled feature vectors of the subset of labeled feature vectors;
applying, by the computing device, unlabeled feature vectors of the set of feature vectors to the classifier to provide a dissimilarity matrix based on a total number of trees in the classifier and sub-numbers of trees in the classifier, each sub-number of trees being specific to a feature vector and indicating a number of trees that classify the feature vector to a same leaf;
based on the dissimilarity matrix, generating, by the computing device, a graph;
for each node of the graph, determining, by the computing device, a second set of labels; and
based on the second set of labels and the first set of labels, determining, by the computing device, a training label for each of the feature vectors in the set of feature vectors to identify a likely level of consumption of the service by service consumers.

20. The non-transitory computer-readable medium of claim 19, wherein the operations comprise:
based on the feature vectors in the set of feature vectors, generating, by the computing device, an additional graph; and
based on the additional graph, selecting, by the computing device, feature vectors to include in the subset of feature vectors.

* * * * *